April 3, 1951 R. J. LENSE ET AL 2,547,023

SELECTIVE CALLING SYSTEM

Filed May 23, 1947 2 Sheets-Sheet 1

INVENTORS
Ralph J. Lense
Alfred S. Holzinger

BY Foorman L. Mueller

Attorney

SELECTIVE CALLING SYSTEM

Filed May 23, 1947 2 Sheets-Sheet 2

INVENTORS
Ralph J. Lense
Alfred S. Holzinger
BY Foorman L. Mueller
Attorney

Patented Apr. 3, 1951

2,547,023

UNITED STATES PATENT OFFICE 2,547,023

SELECTIVE CALLING SYSTEM

Ralph J. Lense, Deerfield, and Alfred S. Holzinger, Chicago, Ill., assignors to Motorola, Inc., a corporation of Illinois Application May 23, 1947, Serial No. 749,952

7 Claims. (Cl. 177—353)

This invention relates generally to frequency responsive systems and more particularly to a selective calling system for use with radio equipment.

In radio installations wherein a plurality of remote stations are used and it is desired to communicate from a central station to one or more of said remote stations, some system is required for signaling the remote station or stations to be contacted. Radio communication systems used by mobile police officers is an example of such a system. The required signaling may be provided by visual or audible signals to notify the called operator that a message is about to be transmitted to him, or alternatively the calling system may automatically condition the receiver of the party to be contacted for operation so that the message will be translated by his receiver only. Although various calling systems have been provided of both the above types, these systems have been relatively complicated and consequently quite expensive. Such systems have in general been patterned after telephone selector equipment which is adapted for use in fixed installations. Therefore, the equipment is not particularly adapted to vehicular installations as is generally required in mobile radio stations.

A suitable selective calling system for mobile use should be of the automatic type, it should be fast in operation and of simple construction so that it may be inexpensively produced. The system should be capable of being actuated by signals provided over the normal voice channel which are of no greater amplitude than the voice signals. Also it is necessary that such a system be capable of providing a relatively large number of different calls. This, of course, depends upon the number of stations in the system and, for example, for police use, would depend upon the size of the city and, therefore, the number of vehicles to be equipped. To cover most presently known applications, systems capable of making from 25 to a maximum of about 400 calls would appear to take care of all requirements.

It is, therefore, an object of the present invention to provide a simple selective calling system which is extremely fast in operation.

It is another object of this invention to provide a selective calling system which is simple and inexpensive and still dependable in operation, and which is capable of providing a large number of different calls.

It is a further object of this invention to provide a selective calling system which operates from signals provided on the normal voice channel and in which the system will be operated by signals of no greater magnitude than said voice signal.

A still further object of this invention is to provide a selective calling system operating on calling signal transmitted on the voice channel at a relatively low level and which discriminates against voice, music and noise signals on said channel.

A still further object of this invention is to provide a selective calling system which responds when signals of a particular frequency are applied thereto and which has a high discrimination against voice, noise and music which include random signals of the particular frequency.

A feature of this invention is the provision of a selective calling system utilizing electromechanical contactors which respond to particular frequencies for conditioning the system for operation when signals of the particular frequencies are simultaneously applied to the contactors.

A further feature of this invention is the provision of a selector responsive system including a pair of electromechanical contactors responsive to two different frequencies and arranged when actuated by said frequencies to charge a condenser to provide a control voltage in which the condenser is not sufficiently charged to provide the required voltage unless the contactors are simultaneously actuated for a definite period of time.

A still further feature of this invention is the provision of a selective responsive device having a pair of vibratory contactors which are responsive to frequencies which differ only slightly and arranged so that when a noise signal including both frequencies is applied thereto both contactors are operated and the system does not respond, but when a signal including only one of said frequencies is applied the system does respond.

Further objects, features and advantages will be apparent from a consideration of the following description taken in connection with the accompanying drawings in which.

In practicing the invention there is provided a selective responsive device including a plurality of electromechanical contactors each having a resonant frequency at which it responds. The contactors are connected in a circuit with a condenser and a source of voltage so that when signals of the proper frequency are applied thereto, the contactors will close the circuit to charge the condenser. The electromechanical contactors may be placed in series and bridged by condensers so that repeated operation is required to charge the main condenser. A resistance is connected in parallel with the main condenser and tends to discharge the same so that the condenser will not be charged to a high value by random operation of the contactors. The voltage developed across the condenser may be used to actuate controls in various ways such as, for example, to provide a bias for a vacuum tube to cause it to conduct and actuate a relay for switching control circuits. The invention further contemplates the use of an auxiliary electromechanical contactor responsive to a frequency differing slightly from the frequency to which the system responds which is effective to discharge the main condenser. This provides discrimination against noise signals as noise which includes the calling frequency will include other adjacent frequencies and the condenser will be discharged by the auxiliary contactor.

Figure 1:
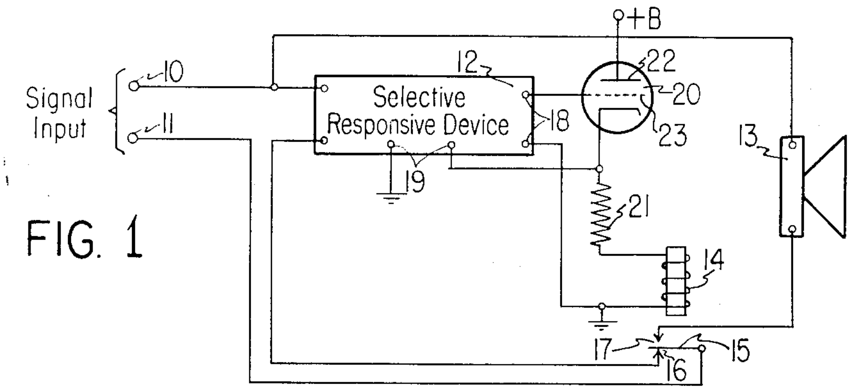
Fig. 1 illustrates a typical selective calling system in accordance with the invention.

Referring now to the drawings, in Fig. 1 there is illustrated a calling system having input terminals 10 and 11 adapted to be connected to any signal source which includes voice signals and calling signals. The signal source may, for example, be a radio receiver or a wire line. The input terminal 10 is connected to a selective responsive device 12 and to a sound reproducing device 13. The terminal 11 is connected to the movable contact 15 of relay 14 which includes fixed contacts 16 and 17 connected to the selective responsive device 12 and the sound reproducing device 13, respectively, so that operation of the relay causes the input to be switched from one of these devices to the other. It is apparent that the selective responsive device can be connected directly to the terminals 10 and 11 and only the sound reproducing device switched by the relay. In this case contact 16 is not required on the relay. The selective responsive device 12 may take various forms as will be hereinafter described but in all instances will be a device adapted to produce a predetermined output voltage when signals of predetermined frequencies are applied thereto, the output voltage appearing at terminals 18. Terminals 19 are provided on the device to which a direct current exciting voltage is applied.

For the purpose of operating the relay 14, the terminals 18 and 19 of the selective responsive device are connected in a circuit including tube 20, resistor 21 and the relay 14. It will be apparent from Fig. 1, that when a +B potential is applied to the plate 22 of the tube 20 a portion of this voltage will appear across the winding of the relay 14 and resistor 21 and will, therefore, be applied to terminals 19. The voltage appearing at terminals 18 of the selective responsive device 12 is applied to the grid 23 of the tube 20 and when a predetermined voltage is reached the output current of the tube will be such that the relay 14 will actuate causing the movable contact 15 thereof to connect the loud speaker to the signal circuit. It is apparent that the operation of the circuit will depend upon the value of resistor 21 and the characteristics of the relay 14, the tube 20 and the selective responsive device 12.

Figure 2:
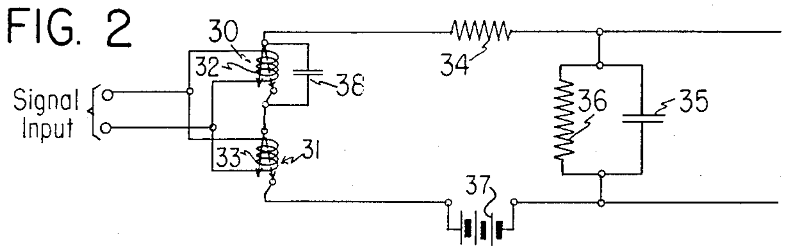
Fig. 2 is a circuit diagram of one embodiment of a selective responsive device in accordance with the invention.

Fig. 2 illustrates one form of selective responsive device which would be suitable for use as the selective responsive device 12 in the circuit of Fig. 1. The selective responsive device includes a pair of electromechanical contactors 30 and 31 including windings 32 and 33. These contactors may be in the form of electromagnetically driven reeds having contacts which establish momentary electrical connection with stationary contact points during the course of each vibration of the reed. In each of the figures the contactors are shown in the open position by solid lines and in the closed position by dotted lines. Windings 32 and 33 provide a magnetic field about the reeds which fluctuates in accordance with the signal applied thereto. The reeds will, of course, vibrate only when one particular frequency is applied thereto or when a very narrow band of frequencies is applied thereto. To provide a broader responsive characteristic a pair of reeds having slightly different natural frequencies can be used in parallel. Various forms of electromechanical contacting devices are commercially available and accordingly will not be described in detail. Electromechanical contactors are available which are responsive to various frequencies and these can be used in different combinations as will be explained.

The contactors 30 and 31 are connected in series with resistor 34, condenser 35 and voltage source 37, resistor 36 being connected in parallel with condenser 35. A condenser 38 is provided across contactor 30, the condenser 38 being very small as compared to condenser 35. When used in a circuit as illustrated in Fig. 1, the voltage across the relay 14 and resistor 21 provides the voltage source and the terminals 18 are connected across the condenser 35 so that the voltage across this condenser is applied to the grid of tube 20.

Referring now to the operation of the circuit of Fig. 2, it will be seen that when a signal is applied to the coils 32 and 33 including frequencies to which the contactors 30 and 31 are responsive, the contactors will intermittently close. The contactors 30 and 31 are selected to be responsive to different frequencies so that the contactors will close simultaneously only infrequently (at the beat frequency of the two contactors), and will normally operate intermittently. When the contactor 31 closes the condensers 35 and 38 will be charged through resistor 34 by the voltage source 37, the voltage on condenser 38 being greater than the voltage on condenser 35 due to the relative size of the condensers. Now when contactor 30 closes the condenser 38 will be discharged with no effect on condenser 35 as contactor 31 is assumed to be opened. Reclosing of contactor 31 will again charge condensers 35 and 38, the charge on condenser 35 being added to the original charge. Continued alternate operation of contactors 30 and 31 will cause additional increments of charge to be applied to condenser 35 until the condenser charges to a voltage approaching that of voltage source 37. The resistor 34 is required in the circuit to prevent rapid charging of the condenser 35 when the contactors 30 and 31 are simultaneously operated, the resistor being relatively small so that it does not appreciably reduce the charge applied to condenser 35 on each closing of the contactor 31. As simultaneous operation of the contactors can be only momentary and will happen only very infrequently by proper selection of the resonant frequency of the contactors, a relatively small resistance is suitable for this purpose.

In order to prevent a charge from accumulating on condenser 35 due to random closing of the contactors over a relatively long period of time, the resistor 36 is provided across condenser 35. The charge on condenser 35 will be dissipated through resistor 36, the value of resistor 36 being large to provide a relatively long time constant. When the signal responsive devices is used in a selective calling system as illustrated in Fig. 1, voice or noise signals are liable to cause the contactors to operate occasionally and haphazardly with the result that the condenser 35 will receive certain charging pulses. However, these pulses will be at sufficiently long time intervals that the charge on the condenser 35 will be dissipated through resistor 36 before any substantial voltage is built up across condenser 35.

The resistor 36 has a further function when the signal responsive device is used in the system of Fig. 1. When the voltage across the condenser 35 is sufficient to cause the tube 20 to conduct, the relay 14 is actuated connecting the signal reproducing device 13 to the signal input. However, as soon as the voltage applied to the grid 23 of tube 20 falls below a certain value, the current through the tube will decrease to such a value that the relay will release and disconnect the loud speaker. The rate at which the voltage on condenser 35 decreases depends, of course, on the rate that the charge is dissipated by resistor 36. By proper selection of the value of resistor 36 the time constant of the resistor and condenser in parallel can be adjusted to a desired value. When the selective calling system is used in a police communications system, for example, it may be desired that the reproducing device be connected just long enough for a central operator to transmit a message to a remote (mobile) station. The central operator can then send the calling signal of the particular remote station to be contacted and transmit the message. Messages used in such a system are generally of more or less standard length. If a larger message is necessary, the operator can transmit the calling signal a second time, or the system can be so arranged that the remote operator can operate a manual control to connect the reproducing device when instructed to do so by the operator.

It is apparent that by using contactors which are responsive to different frequencies, the selective responsive devices can be made to respond to different frequency combinations. When using vibratory reeds as described above, for example, it has been found that about ten different reeds operating within the range of from about 200 to 400 cycles can be satisfactorily used. The use of ten reeds provides forty-five combinations of two reeds each which would take care of a selective calling system having forty-five stations. It is to be pointed out, however, that the system is not limited to the use of ten different reeds or to the frequency range of 200–400 cycles, these figures being only illustrative.

Figure 3:
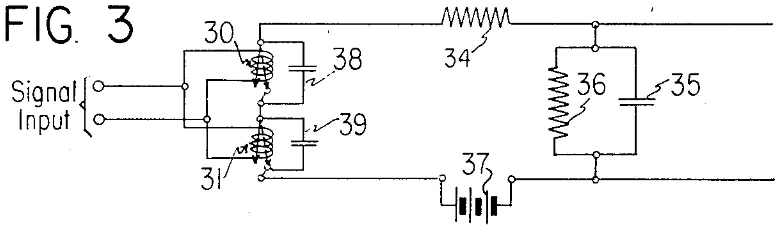
Figs. 3, 4, 5 and 6 illustrate modified selective responsive devices in accordance with the invention.

In Fig. 3 a modified selective responsive device is shown which is identical to the device of Fig. 2 except that a condenser 39 is bridged across the contactor 31. Therefore, in operation of the device after the contactor 31 is closed the condensers 35 and 38 will be charged, and after contactor 30 is closed the condenser 38 will be discharged and the condensers 35 and 39 will be charged. Each time the circuit is closed by one of the contactors, a condition of voltage unbalance is produced in the circuit resulting in flow of charging current from the voltage source 37. Therefore, the number of charge increments applied to the condenser 35 is substantially twice that of the circuit of Fig. 2. Also, the presence of the additional condenser provides a continuous circuit making it possible for charging current to continue to flow after a contactor reopens. This is important where the interval during which the contactors are closed is short, and the resistor 34 retards the charging process so that it is not completed while the contactor is closed. These factors tend to permit substantial increase of the rate at which the condenser 35 is charged. Advantage may be taken of the increase in the rate at which charge increments are applied to the condenser to decrease the magnitude of the charge increments thereby permitting reduction in the required current carrying capacity of the contactors.

Figure 4:
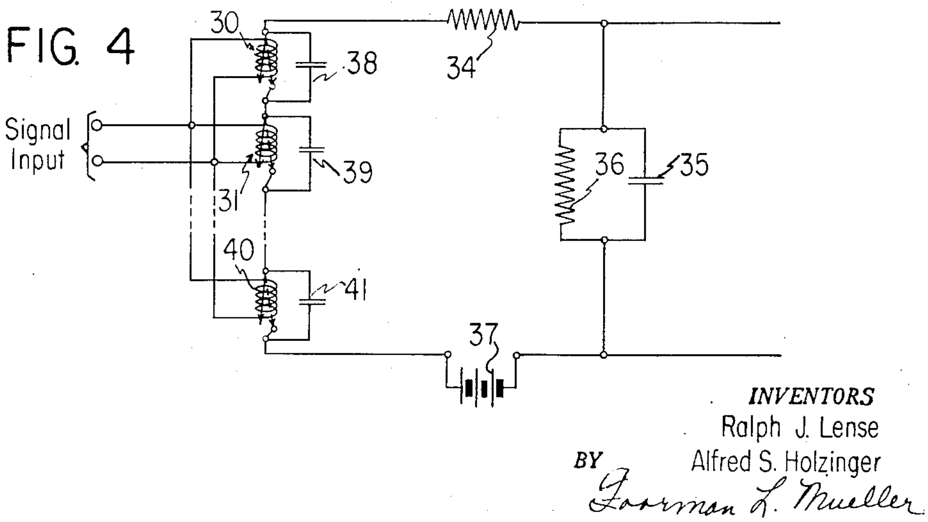

Fig. 4 illustrates that the selective responsive device is not limited to the use of two contactors in series. By the use of additional contactors in series, the number of combinations obtainable by using the same number of different contactors can be increased. For example, when using ten different contactors, by using three contactors in series two hundred and forty combinations are provided. When three contactors are used, three tone signals of the frequency of the contactors will, of course, be required simultaneously for causing operation of the selective responsive device. The device of Fig. 4 has the additional advantage of providing very high noise discrimination, as the likelihood of the three frequencies required for actuating the three contactors being present simultaneously is very small.

Figure 5:
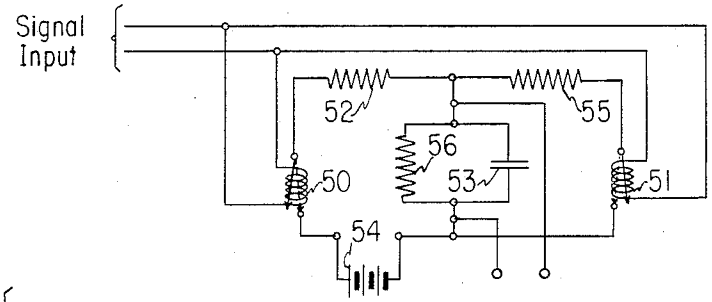

In Fig. 5 there is illustrated a selective responsive device operated by a single tone but arranged to provide high discrimination against signals including the particular tone and other tones of substantially the same frequency. The device is somewhat similar to the preceding modifications and includes a pair of contactors connected in parallel with respect to the main condenser across which the control voltage is built up. These contactors are indicated at 50 and 51 in Fig. 5, the contactor 50 being connected in series with resistor 52, condenser 53, and voltage source 54, and the contactor 51 being connected in series with resistor 55 across the condenser 53. The resistor 56 is connected in parallel with condenser 53 to gradually discharge the same as in the prior circuits. The contactors 50 and 51 are selected to be responsive to slightly different frequencies which are sufficiently close so that if one frequency is present in voice, noise or music, the other frequency would in most cases also be present.

It is apparent from an examination of Fig. 5 that intermittent closing of contactor 50 will cause the condenser 53 to be intermittently connected across the voltage source 54 to be charged thereby. Also, closing of the contactor 51 will cause the condenser 53 to be discharged through resistor 55. By properly selecting the values of the resistors 52 and 55, the device can be arranged so that the condenser 53 will not become charged when the two contactors operate simultaneously. However, it is apparent that operation of the contactor 50 alone will cause the condenser 53 to become charged. Therefore, when a calling signal of the frequency to which contactor 50 is responsive is applied to the device, a voltage will be built up on condenser 53 which can be used in a selective calling system as, for example, in the system of Fig. 1. The system of Fig. 5 is, of course, limited as to the number of calls to which it is responsive by the number of different contactors used. When using reeds as previously described which are available in ten different frequencies, only ten calls are available in this system. The contactor 51 is not effective to provide additional calls but provides discrimination against noise resulting in a very good system where only a small number of stations are required.

Figure 6:
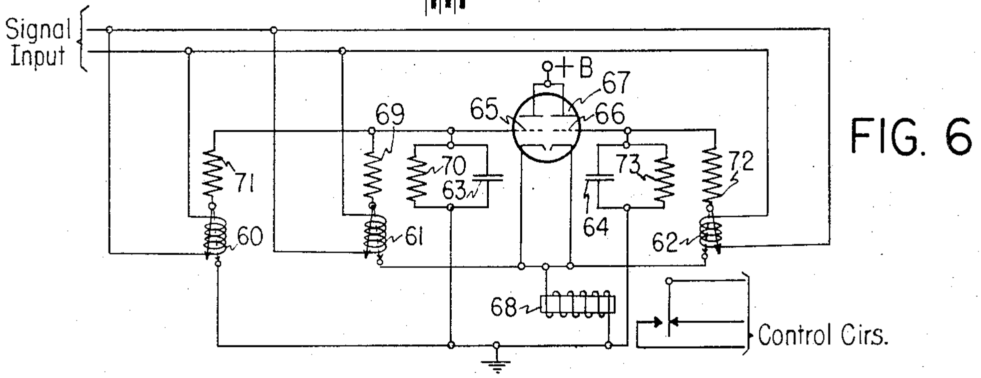

Fig. 6 illustrates a selective responsive device which utilizes the general principles of the device of Fig. 5 and is made more selective by the addition of another electro-mechanical contactor. This device includes contactors 60, 61 and 62, the contactors 60 and 61 being in a circuit including condenser 63 and the contactors 62 being in a circuit including condenser 64. The condensers 63 and 64 are connected to the grids 65 and 66, respectively, of two triode sections included in a single tube 67. The output circuits of the triodes are connected in parallel so that the combined output current therefrom is applied to the winding 68 of a relay. The application of +B voltage to the plates of the triodes will produce a voltage across the winding 68 which is used to charge the condensers 63 and 64 as will be described.

The contactor 61 is connected in series with the winding 68, condenser 63 and a resistor 69 so that closing of the contactor 61 charges the condenser 63 from the voltage appearing across the winding 68. As in prior modifications, a resistor 70 is provided across the condenser 63 of such value to give the circuit the desired time constant. The contactor 60 in series with resistor 71 is connected directly across the condenser 63 so that closing of the contactor 60 discharges the condenser 63 through the resistor 71. Therefore, the contactors 60 and 61 operate in the same manner as the contactors 50 and 51 of Fig. 5 and are selected to be responsive to slightly different frequencies so that both will normally be actuated by noise, voice and music signals and only contactor 61 will be actuated by the calling signal. The contactor 62 is connected in series with the winding 68, condenser 64 and resistor 72 to charge condenser 74 from the voltage across the winding 68, and resistor 73 is provided in parallel with condenser 74 for the reasons previously described. The contactor 62 is selected to be responsive to a calling signal of a frequency differing from that of contactors 60 and 61, and will accordingly be set in motion by this frequency either when received as a part of a noise signal or as a calling signal.

To arrange the system so that it will respond only when a calling signal including the natural frequencies of contactors 61 and 62 is applied, the relay 68 must have such characteristics that plate current from both triode sections will be required to provide sufficient current for actuating the same. When calling signals including these frequencies are then applied, the contactors 61 and 62 will operate causing the condensers 63 and 64 to be charged to provide the voltage required to bias the triode sections so that both sections will conduct. The combined current of the two sections will then be applied to the winding 68 of the relay causing the relay to be actuated. It is seen from the above that charging of either condenser 63 or 64 alone will not cause actuation of the relay but simultaneous charging of both condensers is necessary for this operation. It is, therefore, seen that the contactor 60 which tends to prevent charging of the condenser 63 in the presence of noise will provide high noise discrimination for this system. The contactor 62 will further provide noise discrimination as the likelihood is not great that noise signals will include the frequencies for actuation of both contactors 61 and 62. The contactor 62 further requires a particular signal for actuating the device to thereby increase the number of calls which can be provided. That is, contactors responsive to various frequencies can be used for the two contactors 61 and 62 so that when using vibratory reeds available in ten different frequencies a total of forty-five calls are possible by using a combination of any two of these reeds at a time.

Figure 7:
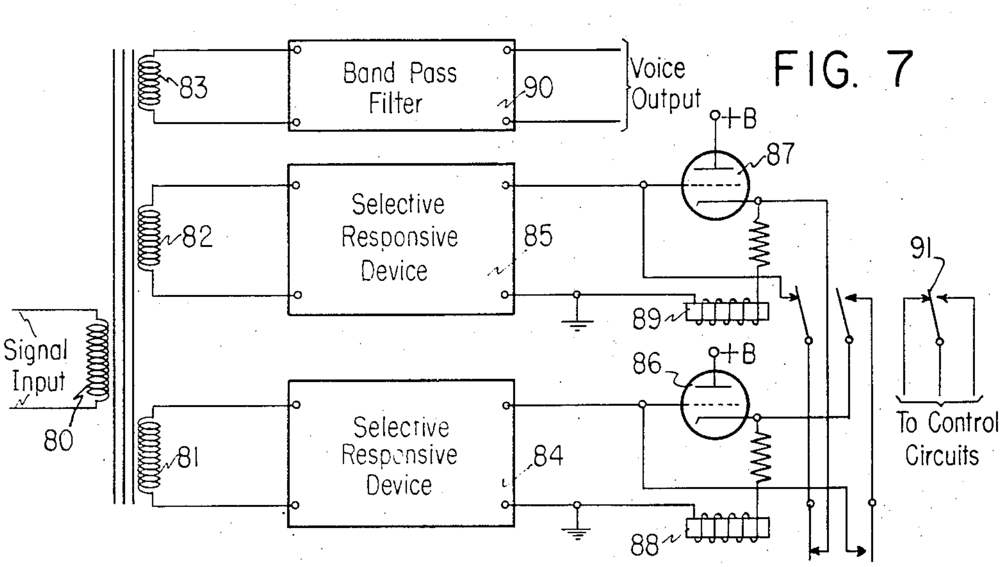
Fig. 7 illustrates a more complicated selective calling system utilizing the improved selective responsive devices in accordance with the invention.

It will be apparent that the selective responsive device of Figs. 2 to 6, inclusive, are not limited in application to a simple selective calling system as illustrated in Fig. 1 but may be used in other types of selective calling systems or in various other types of control systems. For example, the selective responsive device can be used in a selective control system wherein one signal is applied for actuating a control and a second signal is used for disengaging the control. Such a system is illustrated in Fig. 7. An input signal is applied to a winding 80 of a transformer having a plurality of secondary windings 81, 82 and 83. The signal from secondary winding 81 is applied to selective responsive device 84 and the signal from the winding 82 is applied to a similar selective responsive device 85. The selective responsive devices are connected to triode tubes 86 and 87, respectively, which energize relays 88 and 89 in the output circuits thereof, respectively. The relays 88 and 89 include a plurality of movable contacts arranged so that when the tube 86 is made conducting by the voltage from the selective responsive device 84 the tube will continue to conduct until the tube 87 becomes conductive because of the voltage applied by selective responsive device 85. Similarly the tube 87 will remain conducting until tube 86 conducts. This type of relay system is well known and is generally referred to as a "lock-up" relay system. The relays are illustrated with the relay 89 actuated and the relay 88 unactuated. The relay 89 in addition to the holding contacts used in the "lock-up" system includes an additional moving contact 91 adapted to be used in any control circuit such as a circuit for controlling a radio receiver.

The system of Fig. 7 can be used in a radio communications system wherein it is desired that a central operator control the operation of a remote station. In such case, a signal including the frequencies to which device 85 responds can be sent over the line to cause the remote receiver to be conditioned for operation. When it is desired that the remote receiver be disconnected a signal to which the device 84 is responsive will be transmitted over the line. If it is desired to transmit voice signals and calling signals over the same channel, the voice signals can be obtained from the winding 83 and passed through a filter 90 to remove the calling signals and thereafter applied to a translating device which is controlled by the "lock-up" relay system. Therefore, complete control over the remote receiver as well as a communication therewith is provided on a single channel which may be transmitted over a radio or wire system.

From the above description it is apparent that we have provided frequency responsive devices which are of simple and inexpensive construction and which are suitable for use in selective calling systems as required for a mobile station in a radio communication network. These calling systems have been found to be highly selective and to provide dependable service. The calling system in accordance with the invention is adapted to be constructed as a small and rugged unit as is required for vehicular use.

Although we have described certain embodiments of our invention, it is apparent that various changes and modifications can be made therein without departing from the intended scope of the invention as defined in the appended claims.

We claim:

1. A selective responsive system including an electromechanical contactor adapted to respond to a signal of a first frequency, a second electromechanical contactor adapted to respond to a signal of a second frequency, a pair of capacitors individually bridging said contactors, an additional capacitor, a voltage source, and a series circuit including said contactors, said additional capacitor and said voltage source, said contactors including contacts adapted to intermittently close upon simultaneous application of signals of said first and second frequencies thereto to alternately close said series circuit to connect said additional capacitor to said voltage source to charge the same, said bridging capacitors completing said series circuit when said contacts of the associated contactors are open and being shorted when said contacts of the associated contactors are closed.

2. A selective responsive system including an electromechanical contactor adapted to respond to a signal of a first frequency, a second electromechanical contactor adapted to respond to a signal of a second frequency, at least one capacitor bridging one of said contactors, an additional capacitor, a voltage source and a series circuit including said contactors, said additional capacitor and said voltage source, said contactors including contacts adapted to intermittently close upon simultaneous application of signals of said first and second frequencies thereto to intermittently close said series circuit to connect said additional capacitor to said voltage source to charge the same, said bridging capacitor completing said bridging circuit when the associated contactor is open and being shorted when said associated contactor is closed.

3. A selective responsive system comprising an electromechanical contactor adapted to be actuated by a signal of a first frequency, a second electromechanical contactor adapted to be actuated by a signal of a second frequency, a capacitor bridging one of said electromechanical contactors, an additional capacitor, a resistor, a source of voltage, and a circuit including said contactors, said additional capacitor, said resistor and said voltage source and arranged so that application of signals of said first and second frequencies to said contactors is effective to connect said additional capacitor to said voltage source to charge the same, said resistor being connected across said additional capacitor and tending to discharge the same, the values of said resistor and said additional capacitor being such that simultaneous application of signals of said first and second frequencies to said contactors causes said additional capacitor to be charged at a greater rate than that at which it is discharged by said resistor, and random application of signals of said frequencies to said contactors causes said additional capacitor to be charged at a lesser rate than that at which it is discharged by said resistor.

4. Selective calling apparatus for use in a communication system in which voice and calling signals are transmitted on the same channel and in which noise is present at high volume in the absence of voice and calling signals, said apparatus comprising, an electromechanical contactor adapted to be actuated by a signal of a first frequency, a second electromechanical contactor adapted to be actuated by a signal of a second frequency, a capacitor bridging one of said electromechanical contactors, an additional capacitor, a resistor and a source of voltage, said contactors being adapted upon application of signals of said first and second frequencies thereto to connect said additional capacitor to said voltage source to charge the same, said resistor being connected across said additional capacitor and tending to discharge the same at a predetermined rate, the values of said resistor and said additional capacitor being such that simultaneous application of signals of said first and second frequencies to said contactors causes said additional capacitor to be charged at a rate greater than said predetermined rate, and random application of signals of said first and second frequencies to said contactors as is present in voice and noise signals causes said additional capacitor to be charged at a rate less than said predetermined rate.

5. A selective responsive system including an electromechanical contactor having contacts adapted to be intermittently closed in response to a signal of a first frequency, a second electromechanical contactor having contacts adapted to be intermittently closed in response to a signal of a second frequency, a pair of capacitors individually bridging said contactors, an additional capacitor, a voltage source, and a circuit including said additional capacitor, said voltage source, and said contacts of said electromechanical contactors, said contacts operating to connect said additional capacitor to said voltage source to provide an increment of charge thereon when either of said contacts is closed.

6. A selective responsive system including in combination, a first electromechanical unit adapted to respond to a signal of a first frequency, a second electromechanical unit adapted to respond to a signal of a second frequency, each of said units including mechanical means adapted to vibrate when a signal including the frequency to which said unit responds is applied thereto and electrical means rendered intermittently conducting by said mechanical means when said mechanical means vibrates, main capacitor means, a voltage source, a series circuit including said electrical means of said electromechanical units, said main capacitor means and said voltage source, said series circuit operating to charge said main capacitor means from said voltage source in response to a signal including said first and second frequencies, and first and second circuit means each including a capacitor, said circuit means being individually connected across said electrical means of said units for completing said series circuit when the associated electrical means is not conductive and being shorted when said electrical means is conductive.

7. A selective responsive system including in combination, a first electromechanical unit having mechanical means adapted to vibrate in response to a signal of a first frequency and electrical means providing a path which is intermittently conducting when said mechanical means vibrates, a second electromechanical unit having mechanical means adapted to vibrate in response to a signal of a second frequency and electrical means providing a path which is intermittently conducting when said mechanical means vibrates, first and second bridging circuits including capacitors individually connected across said electrical means of said units, main capacitor means, a voltage source, and a series circuit including said main capacitor means, said voltage source, and said electrical means of said electromechanical units, said series circuit connecting said main capacitor means to said voltage source in response to a signal including said first and second frequencies, with an increment of charge being applied to said main capacitor means when said electrical means of either of said units is rendered conducting.

RALPH J. LENSE.
ALFRED S. HOLZINGER.

REFERENCES CITED

The following references are of record in the file of this patent:

UNITED STATES PATENTS

| Number | Name | Date |
|---|---|---|
| 2,070,900 | Harris | Feb. 16, 1937 |
| 2,176,742 | La Pierre | Oct. 17, 1939 |
| 2,307,771 | Denton | Jan. 12, 1943 |
| 2,353,499 | Purington | July 11, 1944 |
| 2,368,953 | Walsh | Feb. 6, 1945 |
| 2,431,167 | Byrnes | Nov. 18, 1947 |
| 2,457,149 | Herbst | Dec. 28, 1948 |

FOREIGN PATENTS

| Number | Country | Date |
|---|---|---|
| 172,321 | Great Britain | Nov. 2, 1922 |
| 261,384 | Great Britain | Oct. 6, 1927 |